(12) United States Patent
Elwart et al.

(10) Patent No.: US 7,797,929 B2
(45) Date of Patent: Sep. 21, 2010

(54) LOW TEMPERATURE EMISSION CONTROL

(75) Inventors: Shane Elwart, Ypsilanti, MI (US);
Jason Aaron Lupescu, Ypsilanti, MI (US); Joseph Robert Theis, Rockwood, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 706 days.

(21) Appl. No.: 11/751,414

(22) Filed: May 21, 2007

(65) Prior Publication Data

US 2008/0289318 A1 Nov. 27, 2008

(51) Int. Cl.
*F02B 27/04* (2006.01)
*F01N 3/00* (2006.01)
*F01N 3/10* (2006.01)

(52) U.S. Cl. .............. 60/295; 60/273; 60/285; 60/286; 60/301

(58) Field of Classification Search .......... 60/285, 60/286, 295, 301, 273, 284
See application file for complete search history.

(56) References Cited

U.S. PATENT DOCUMENTS

| | | | |
|---|---|---|---|
| 6,244,043 B1 | 6/2001 | Farmer et al. | |
| 6,250,074 B1 | 6/2001 | Suzuki et al. | |
| 6,467,259 B1* | 10/2002 | Surnilla et al. | 60/285 |
| 6,477,834 B1* | 11/2002 | Asanuma et al. | 60/295 |
| 6,823,843 B1 | 11/2004 | Goralski, Jr. et al. | |
| 7,003,944 B2 | 2/2006 | Surnilla et al. | |

FOREIGN PATENT DOCUMENTS

| GB | 2329260 | 3/1999 |
|---|---|---|
| WO | 01/04479 | 1/2001 |

OTHER PUBLICATIONS

ISA Intellectual Property Office, United Kingdom, International Search Report of GB0808674.6, Jan. 19, 2009, 1 page.

* cited by examiner

*Primary Examiner*—Thomas E Denion
*Assistant Examiner*—Audrey Klasterka
(74) *Attorney, Agent, or Firm*—Julia Voutyras; Alleman Hall McCoy Russell & Tuttle LLP

(57) ABSTRACT

A method of controlling an engine having a lean NOx trap in the exhaust is described. The method comprises during a first mode, at a first temperature, storing NOx at a lean condition and then purging stored NOx from the NOx trap at a rich condition without concurrently supplying oxygen to the trap during the purging and during a second mode, at a second, lower temperature, storing NOx at a lean condition and then purging stored NOx from the NOx, where an exothermic reaction is generated to temporarily raise the temperature of the trap by supplying oxygen and reductants with an overall rich mixture to the trap during the purging.

19 Claims, 9 Drawing Sheets

LOW TEMPERATURE EMISSION CONTROL

BACKGROUND AND SUMMARY

Catalytic converters, such as lean NOx traps (LNT) may be used to reduce NOx emissions, such as from engines that may operate lean of stoichiometry. Performance of an LNT to store, release, and reduce NOx may be affected by various operating conditions, including temperature. Specifically, during lower temperature ranges, the LNT may exhibit degraded storage, release, and/or reduction. As such, various approach have been used to locate the LNT at an optimal position along the exhaust path to balance the desire for a fast light-off from cold start operation, as well as reduce over-temperature operation during high loads, for example.

However, in some conditions, either the LNT is placed too far downstream of the engine (resulting in slow light-off) or the LNT is placed too close to the engine (resulting in accelerated degradation). Further, even when a balance may be achieved between these extremes, where the optimal efficiency region of the LNT is utilized as much as possible (e.g., temperature is maintained between approximately 300° C. and 500° C.), there may still be a lower temperature region in which the LNT may be used but with degraded reaction efficiency during release and reduction.

The inventors herein have recognized that it may be possible to retain efficient placement of the LNT, while also addressing low temperature operation. Specifically, the inventors herein have recognized that even when steady state operating temperatures are in a lower temperature region, it is possible to utilize a locally generated exothermic reaction (which may be locally generated, such as on the LNT), during overall rich air-fuel ratio purging operation. The temporary temperature increase during the purge enables more efficient release of stored NOx (thus leaving the LNT more able to store NOx during subsequent lean operation) as well as more efficient reduction of the released NOx. In addition, the temperature of the LNT remains elevated for a portion of the next lean period, which can improve the $NO_x$ storage efficiency during that time. In this way, it is possible to perform NOx storage and release/reaction at different local temperatures to achieve improved performance in NOx emission control. In one example of the embodiment, the exothermic reaction may be generated using a split engine cylinder operation, where some cylinders operate rich and other cylinders operate lean, while the overall air-fuel ratio is still rich. In this way, not only is it possible to generate an exothermic reaction during lower temperature conditions, but the engine can operate with increased fuel saving as some cylinders can operate at increased efficiency by operating lean. As another example, the amount of exothermic heat generated during lower temperature purging operation may be adjusted based on catalyst aging to enable improved performance. As still another example, the amount of exothermic heat may be controlled in the split cylinder operation by adjusting the duration and/or extent of the lean operation during the purging. As one non-limiting example, the lower temperature range may be between 200° C. to 300° C. (or 200° C. to 350° C.), where during temperatures above and/or below this range, purging is performed without generating the exothermic reaction with split cylinder operation.

WRITTEN DESCRIPTION

Lean $NO_x$ traps may be effective for treating the $NO_x$ emissions from lean-burn gasoline or diesel engines at temperatures above approximately 300° C. However, their effectiveness may decrease at temperatures below 300° C. due to incomplete purging, reduced $NO_x$ conversion efficiency during the rich purges, and low conversion of NO to $NO_2$ during the lean storage phases. In one embodiment, it is proposed that the trap can be more completely purged at temperatures below 300° C. by generating an exotherm locally on the LNT during the rich purge. This can be accomplished in a variety of ways, such as by providing a mixture of reductant (e.g., CO, $H_2$, or HC) and some oxygen ($O_2$) during the purge. As an example, the level of $O_2$ provided is less than that required to oxidize all of the reductant, so the overall mixture is net rich (e.g., between 7 and 30% rich, for example). However, the reaction between the $O_2$ and some of the reductant on the LNT generate heat to temporarily and locally increase LNT temperature and improve the effectiveness of the purge. The temperature increase also decreases the amount of purge $NO_x$ release at low temperatures by improving the $NO_x$ reduction activity of the trap. The performance at low temperatures can be further improved by pre-oxidizing some of the NO to $NO_2$ over a lightoff catalyst located upstream of the LNT, for example. The combination of improved purging, improved $NO_x$ reduction activity, and improved storage efficiency with the use of $NO_2$ may improve the $NO_x$ performance of the LNT at low temperatures.

Figure 1:
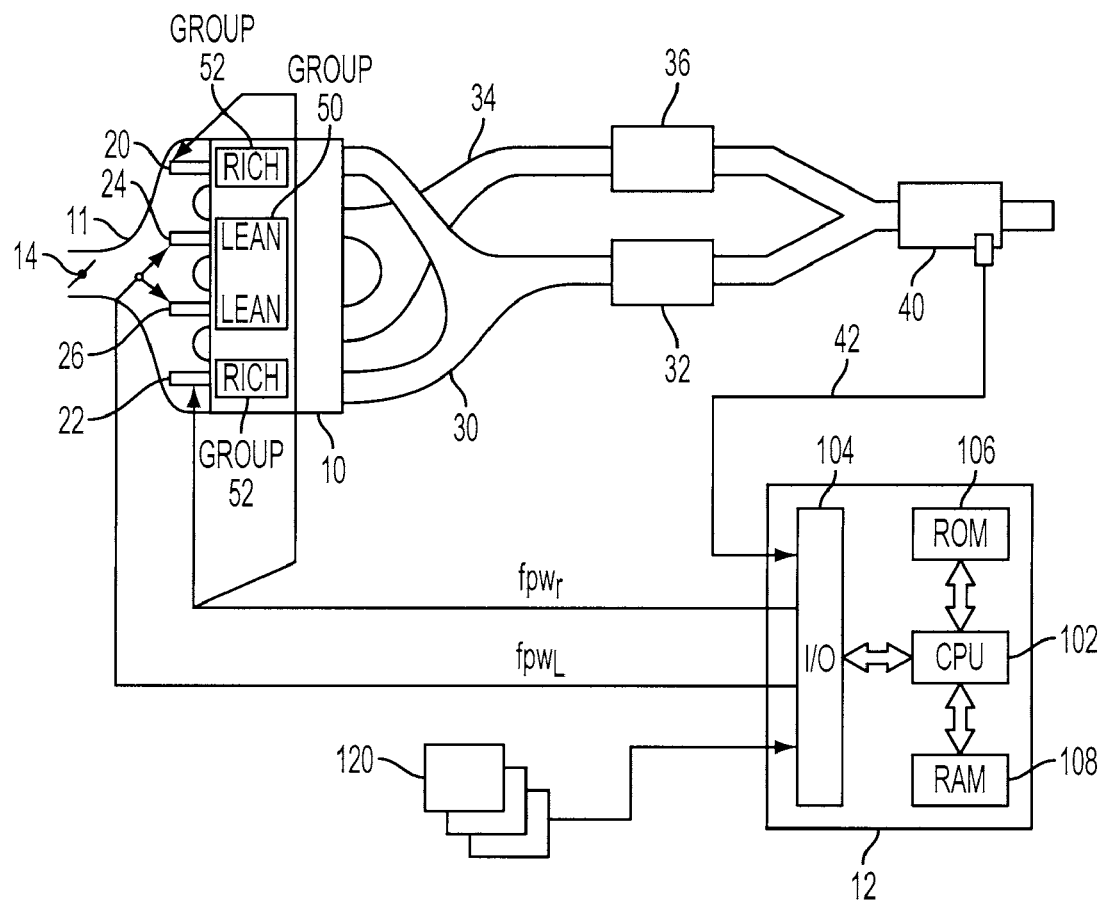
FIG. 1 shows an example engine and exhaust system configuration.

FIG. 1 shows internal combustion engine 10, comprising multiple cylinders coupled to intake manifold 11. The engine cylinders are capable of operating within a range of air/fuel ratio ranging from a lean limit to a rich limit. FIG. 1 shows two cylinders in group 50 (operating at a lean air/fuel ratio in this example) and two cylinders in group 52 (operating at a rich air/fuel ratio in this example). The cylinders of engine 10 receive air from intake manifold 11 under control of throttle plate 14. Group 52 cylinders receive fuel from injectors 20 and 22, and group 50 cylinders receive fuel from injectors 24 and 26. Two catalysts 32 and 36, are shown, and may be positioned in a close coupled position. Catalyst 32, 36 may be three way catalysts in one example.

Trap 40 may include a lean $NO_x$ trap, which may include various formulations with relatively high concentrations of alkaline-earth metals (e.g., barium) and/or alkali metals (e.g., potassium) in the washcoat to increase capacity for storing $NO_x$ under lean conditions. During lean operation, NO in the exhaust is oxidized over precious metal (i.e., platinum) in the trap to produce $NO_2$. The $NO_2$ then reacts with the $NO_x$ storage materials and addition oxygen to form adsorbed $NO_x$ species, such as nitrites or nitrates. The lean periods typically last on the order of 20 to 60 seconds, depending on the flow rate and feedgas $NO_x$ concentrations, although the lean period may be shorter or longer.

While the described embodiment employs two cylinders operating rich and an equal number of cylinders operating lean, various alternative embodiments are possible. For example, more or less cylinders may be used with the number of lean and rich cylinders also being variable. For example, an 8 cylinder engine may have 5 cylinders operating lean with 3 cylinders operating rich. In either equally or unequally divided systems, the lean and rich air/fuel ratios may be adjusted, coordinated, and/or controlled as will be described later herein with particular reference to FIGS. 2-4.

Controller 12 is shown in FIG. 1 as a microcomputer including: microprocessor unit 102, input/output ports 104, read-only memory 106, random access memory 108, and a conventional data bus. Controller 12 is shown receiving various signals from sensors 120 coupled to engine 10. In addition, controller 12 receives an indication of trap 40 temperature (T) from temperature sensor 42. Alternatively, temperature (T) may be estimated using various methods. Controller 12 also sends fuel pulse width signal fpwr to fuel injectors 20 and 22 and sends signal fpwl to fuel injectors 24 and 26.

As described herein, the engine may be operated lean and periodically transition to provide a rich air-fuel ratio to purge NOx stored during lean operation. Alternatively, reductant may be added to the exhaust to control exhaust air-fuel ratio. During the lean operation, as the trap begins to fill up with $NO_x$, the $NO_x$ storage efficiency tends to decrease as available storage sites decrease. During purging, the stored $NO_x$ is reduced to $N_2$ to regenerate the $NO_x$ storage capacity. As noted, this is accomplished by exposing the LNT to rich conditions for a duration on the order of 2 to 5 seconds, for example, although it may be longer or shorter. Hydrogen in the exhaust may promote the decomposition of the adsorbed $NO_x$ species, releasing the stored $NO_x$ which then reacts with additional reductant in the rich exhaust over the precious metal to form nitrogen ($N_2$). This purges the trap and frees storage sites which can then store $NO_x$ again during the next lean period.

Operational performance of lean $NO_x$ traps may vary with operating temperature, and increased performance may be generally achieved in a range of between 300° C. and 500° C., although this range may vary with formulation, etc. Based on teachings of prior approaches, when operating in a lower temperature window, it is required to increase the steady state temperature (e.g., temperature for both the storing and purging) in order to increase overall performance so that both effective storing, release, and reduction of $NO_x$ may occur. However, it may not always be possible to increase steady state temperature effectively and/or efficiently. Rather, when operating at lower temperatures, it may be possible to use an exotherm to temporarily increase temperature during purging to improve the extent of purging and $NO_x$ reduction as well as to improve the resulting storage that follows at the lower temperature. For example, while one option may be to increase steady state temperatures of the exhaust, another option may be to temporarily increase temperature in the vicinity of the trap during purging using an exotherm, without increasing the overall steady state temperature.

As described herein, one approach to generating an exotherm at lower temperatures during LNT purging may use a split cylinder, or split bank, approach. In one example, a first bank or group of cylinders is operated rich and a second bank or group of cylinders is operated with excess oxygen (e.g., lean). The exhaust gasses from the separate groups or banks meet and mix in or upstream of the LNT and generate heat, where the amount of flow, leanness, richness, etc., can be selected and adjusted to achieve a selected temperature, temperature rise, and/or temperature profile. When sufficient exotherm is provided, the lean group can be adjusted to stoichiometry and/or rich operation to reduce the purge exotherm.

Specifically, rich cylinders (e.g. group 52) may be used to produce exhaust gas that has unburned hydrocarbons and carbon monoxide while the lean cylinders produce exhaust flow that has excess oxygen. The rich exhaust gas exits the rich cylinders through manifold 30 and passes through first three way catalyst 32. The lean exhaust gas exits group 50 through manifold 34 and passes through second three way catalyst 36. Rich and lean gases then come together to form an exhaust mixture with an overall rich exhaust gas mixture before entering lean NOx trap 40. The catalytic activity of trap 40 promotes an exothermic chemical reaction from the exhaust mixture formed of both lean and rich gases, resulting in catalyzed combustion, the generation of heat, and the temporary increase of temperature of trap 40 during at least a portion of the low temperature NOx purge. The purging operation may then include operating of both cylinder groups rich, for example, or one bank rich and one bank at stoichiometry.

Another approach to generating an exotherm may be to operate all cylinders lean and/or slightly lean, and supply reductant directly into the exhaust, such as upstream of the LNT. Further, rich cylinder operation with excess air delivered to the engine exhaust may be still another alternative embodiment.

Figure 2:
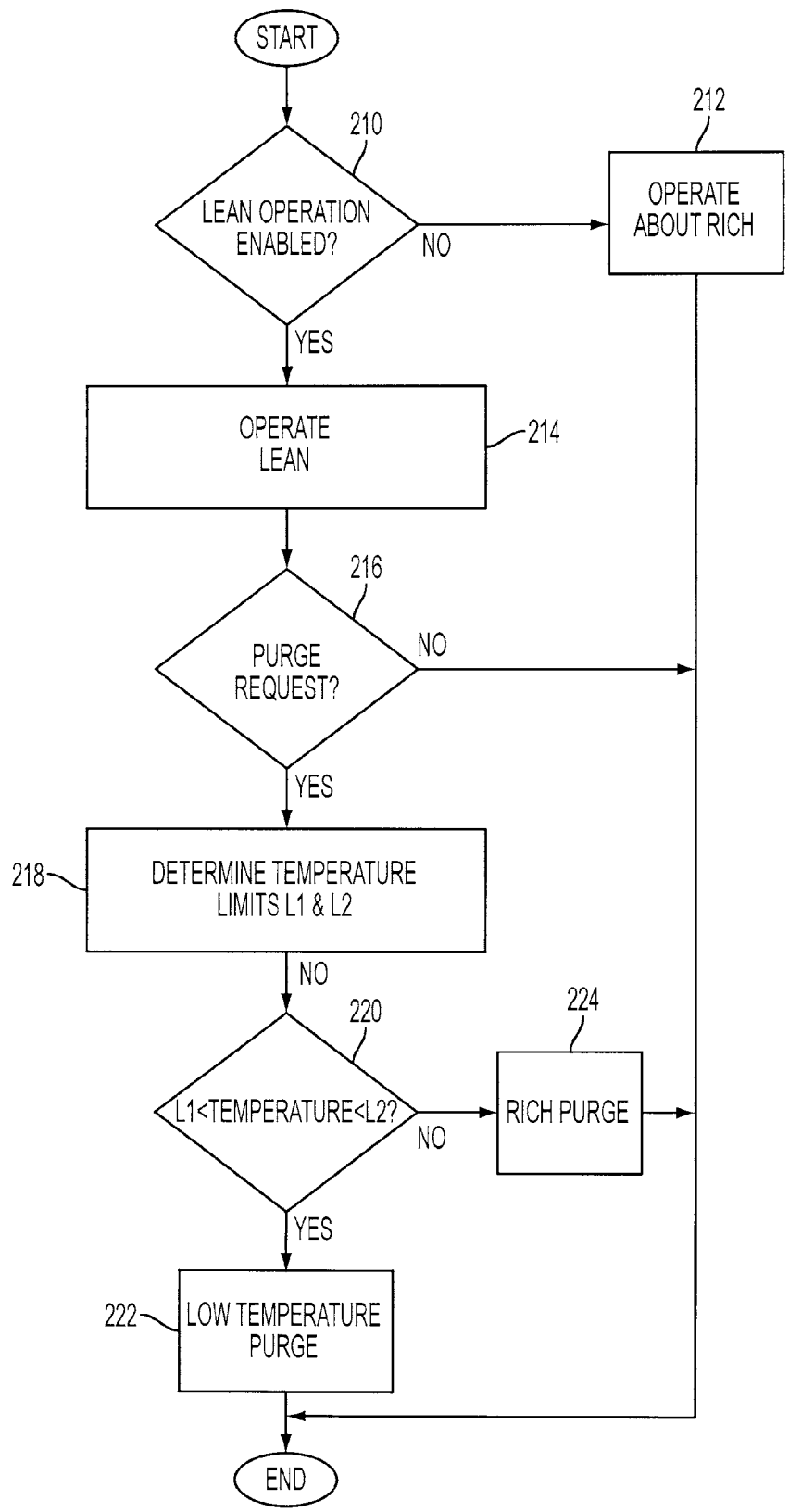
FIGS. 2-3 show high level flowcharts of operation.
Figure 3:
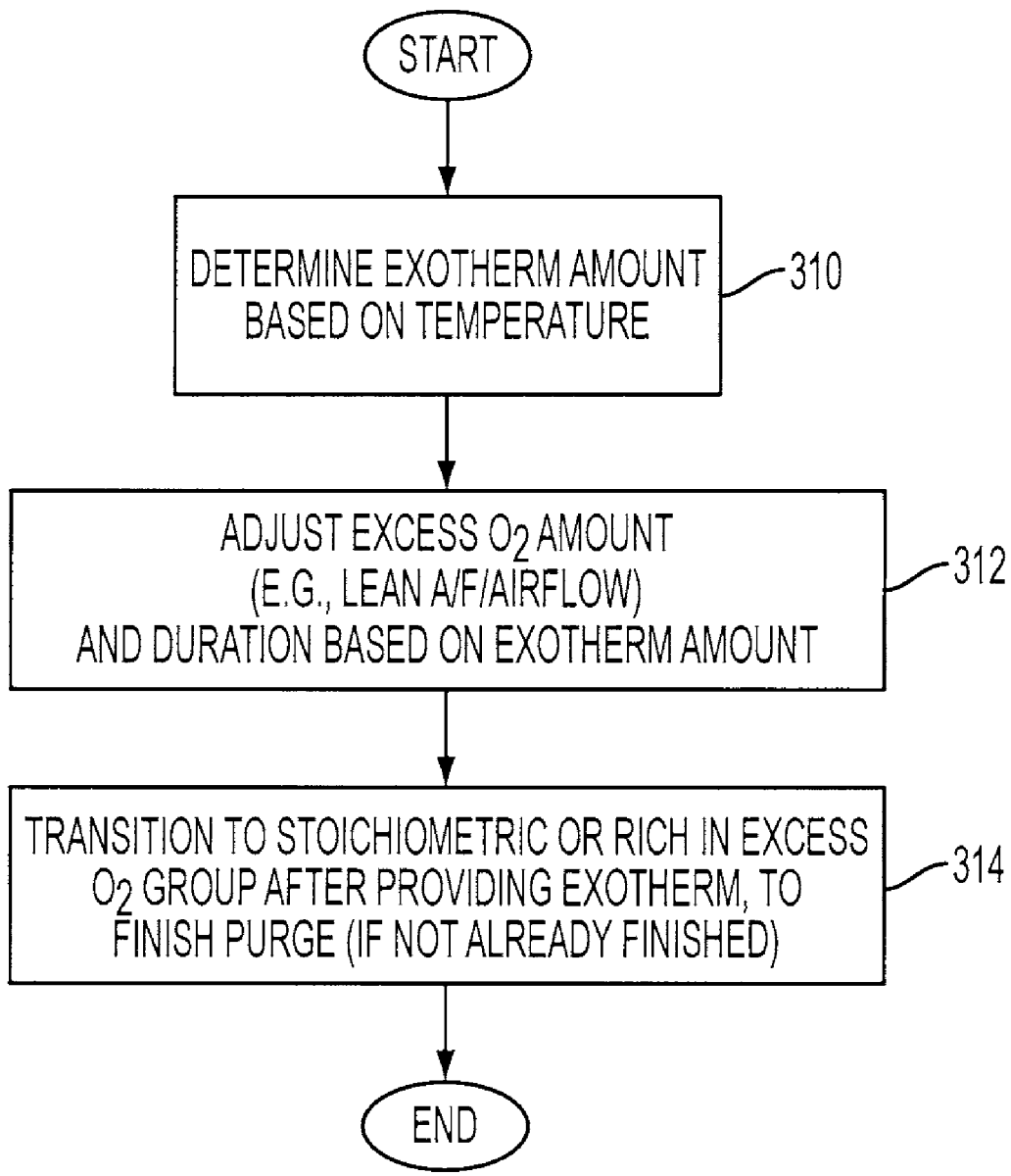

The following FIGS. 2-3 are high level flow charts of various operations that may be enable advantageous use of an exotherm during low temperature NOx trap purging. The specific routines described below in the flow diagrams may represent one or more of any number of processing strategies such as event-driven, interrupt-driven, multi-tasking, multithreading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. Although not explicitly illustrated, one or more of the illustrated acts or functions may be repeatedly performed depending on the particular strategy being used. Further, these figures may graphically represent code to be programmed into the computer readable storage medium in a controller.

Referring now to FIG. 2, a routine for controlling overall engine operation is described. First, in 210, the routine determines whether lean operation is enabled, such as based on engine speed, load, engine coolant temperature, etc. If not, the routine continues to 212 to operate stoichiometric, e.g., oscillating about stoichiometry, or rich. Otherwise, the routine continues to 214 to operate the engine in a lean burn mode.

Continuing with FIG. 2, in 216, the routine determines whether a NOx purge request is present, such as based on an amount of tailpipe NOx, an amount of stored NOx, NOx storage efficiency, etc. If so, the routine continues to 218 to determine upper and lower temperature limits (L1, L2) for performing a low temperature purge, based on operating conditions, such as engine speed, load, NOx storage, engine out NOx levels, etc. In one example, the temperature limits are 200° C. and 300° C., respectively. However, the values may vary with operating conditions, catalyst composition, and/or catalyst degradation. For example, the temperature window for the low temperature purges may be expanded as the NOx trap degrades and/or ages. In other words, the low temperature purging may be performed at a greater range of temperature as the NOx trap degrades and/or ages.

Figure 4A:
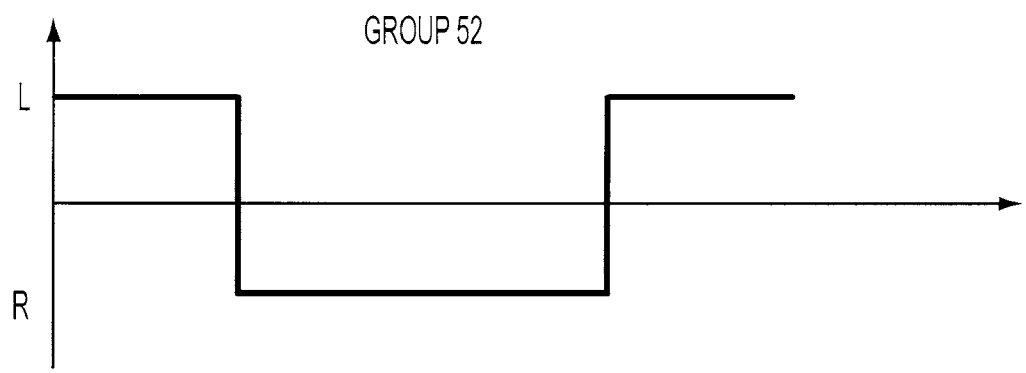
FIG. 4 shows a graph illustrating air-fuel ratio of a first and second group of cylinders during storage and purging at lower temperatures.
Figure 4B:
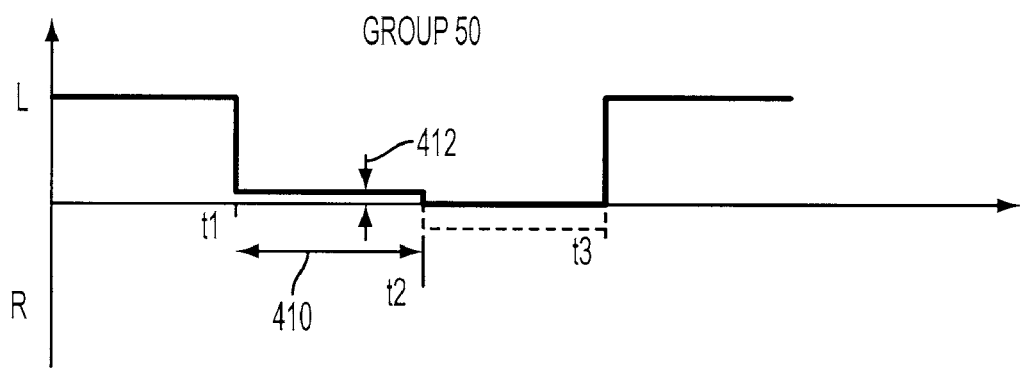

Continuing with FIG. 2, when steady state exhaust temperature, or catalyst temperature, is within the temperature limits, as determined in 220, the routine continues to 222 to perform a low temperature purge, as described herein, such as with regard to FIGS. 3-4, and others. Otherwise, the routine continues to 224 to perform a rich purge, such as where the exhaust air-fuel ratio is change from lean to rich for a specified duration. Note that the level of richness and/or duration of richness may be adjusted based on operating conditions to provide desired NOx purge performance. In one embodiment, all cylinder may operate at a common rich air-fuel ratio, or some cylinders may provide a higher and/or lower air-fuel ratio. For example, some cylinders may operate rich and others stoichiometric to reduce fuel used to reduce upstream oxygen storage, such as in one of catalysts 32,36, for example.

Referring now to FIG. 3, additional details of a low temperature NOx purge from 222 are described. As noted herein, in one approach, the exotherm may be provided by operating some cylinders with excess oxygen and other cylinders with excess reductants. In the embodiment illustrated in FIG. 3, two cylinders may be operated lean and two cylinders operated rich during at least a portion of the NOx purge, to provide an overall rich exhaust to LNT 40. Specifically, in 310, the routine determines a desired exotherm amount based on the catalyst temperature. For example, the routine may determine that at 250° C., a greater exotherm is desired than at 300° C. Further, the exotherm amount may be adjusted based on the amount of NOx stored, and/or various other factors. Next, in 312, the routine adjusts the excess oxygen amount in the lean group (e.g., by adjusting air-fuel ratio and/or airflow), and duration of the lean operation, based on the desired exotherm amount. Then, in 314, the routine transitions the lean group to stoichiometric and/or rich operation after providing the desired exotherm, and continues the overall rich purging operation, if desired.

This operation is further illustrated in FIG. 4, which shows the air-fuel ratio of two cylinder groups during an example NOx cycle. Specifically, FIG. 4 shows group 52 of FIG. 1 in the upper graph, and the group 50 of FIG. 1 in the lower graph. A low temperature NOx purge is initiated at t1, and both cylinders transition from a lean air-fuel ratio. Specifically, cylinders in group 52 transition from lean to rich (where the rich air-fuel ratio may be adjusted with operating conditions as noted herein), and cylinders in group 50 transition from lean to less lean, such as 1% excess oxygen, for example. Note that 1% is just one example of an amount of excess oxygen that can be provided, and the amount may be less than 2%, 3%, 4%, or others, and the amount provided may vary with operating conditions, such as catalyst temperature. Further, while this example shows that the air-fuel ratios of both cylinder groups remain relatively constant between different points, this is just an example, and the air-fuel ratios may be adjusted with various operating conditions, may ramp to desired values, may oscillate about desired values, etc. During duration 410, an exotherm is generated in the LNT between excess reductants and excess oxygen. The size of duration 410 may be adjusted to produce more or less heat, depending on operating conditions, such as the temperature before the purge is initiated. Alternatively, or in addition, the amount of excess oxygen may also be adjusted to adjust the amount of heat generated, or when/where the exotherm occurs, and/or the profile of the exotherm. For example, the profile of excess oxygen may control the heat generation profile, as excess oxygen may be the limiting factor in the exothermic reaction, since the overall air-fuel ratio may be maintained rich during the duration from t1 to t3.

At t2, sufficient heat is generated to increase NOx release and subsequent NOx reduction, and the air-fuel ratio is again changed to stoichiometric (or rich as indicated by the dashed line). Then, at t3, the purge is ended and another lean cycle is initiated (or the A/F ratio of both groups can return to stoichiometry).

To illustrate the advantages of selected features described herein, the following figure shows example test data. The data shows tests of a 0.25" long LNT containing 5.7% potassium (as a percentage of the washcoat weight) and 100 gpcf (grams per cubic foot) platinum exposed to 10 minute lean periods alternated with 3 minute rich periods at different temperatures. Note that these periods are selected for laboratory testing purposes, and may not represent actual operating times in an engine.

Figure 5:
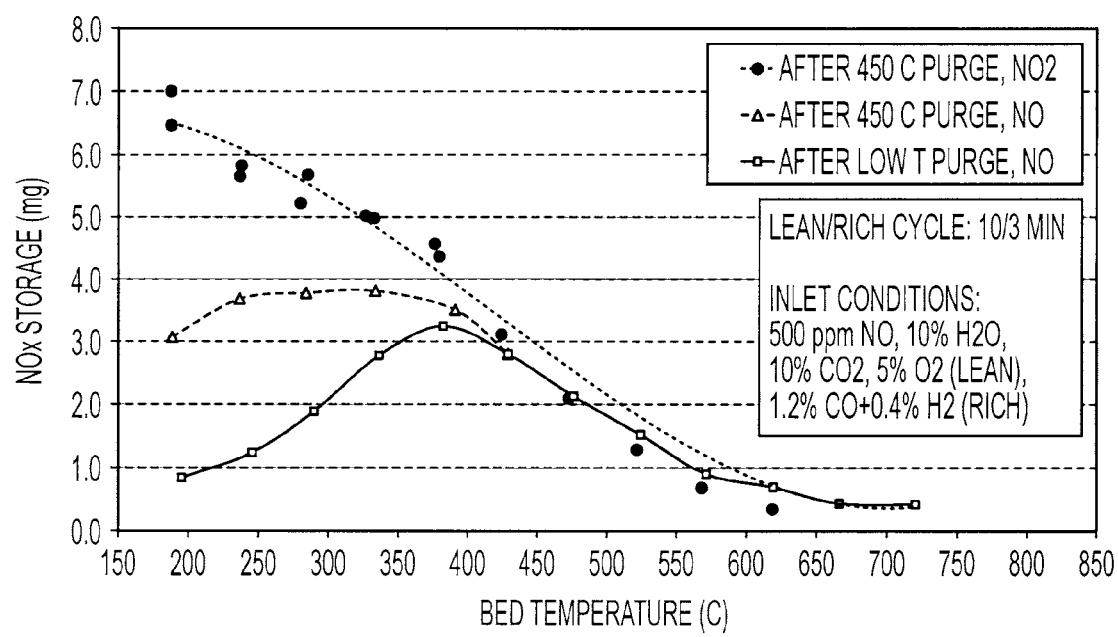
FIG. 5 shows experimental data illustrating the amount of $NO_x$ stored on a fresh 0.25" potassium/platinum/alumina LNT vs. temperature (1) with 500 ppm NO in the feedgas after purging at the storage temperature, (2) with 500 ppm NO in the feedgas after purging at 450° C., (3) with 500 ppm $NO_2$ in the feedgas after purging at 450° C.

FIG. 5 shows the amount of $NO_x$ stored during the 10 minute lean periods as a function of the bed temperature.

The solid line shows that at temperatures above 400° C., the amount of $NO_x$ stored decreases with increasing temperature due to the decreasing stability of the nitrates. At temperatures below 350° C., the ability of the LNT to oxidize NO to $NO_2$ is one factor that limits how much $NO_x$ can be stored. However, another factor limiting the $NO_x$ storage capacity at low temperatures relates to the effectiveness of the purges. The trap may not be completely purged at low temperatures, so some storage sites retain the stored $NO_x$ and thus cannot contribute to the $NO_x$ storage performance during the next lean period.

The dashed line with triangles illustrates how temporary heating during the purging operation can improve the $NO_x$ storage performance at lower average temperatures, such as when the cycle average temperature over $NO_x$ storage and purging operation is below a threshold value. Specifically, the test LNT was heated to 450° C. and purged with rich exhaust for 3 minutes. Then the trap was cooled down to a lower temperature, and the $NO_x$ storage was evaluated. This process was repeated for several low temperatures. A comparison of the solid line and dashed line with triangles illustrate the improvement in $NO_x$ storage performance obtained after purges at 450° C. relative to the performance obtained after the low temperature purges.

Figure 6:
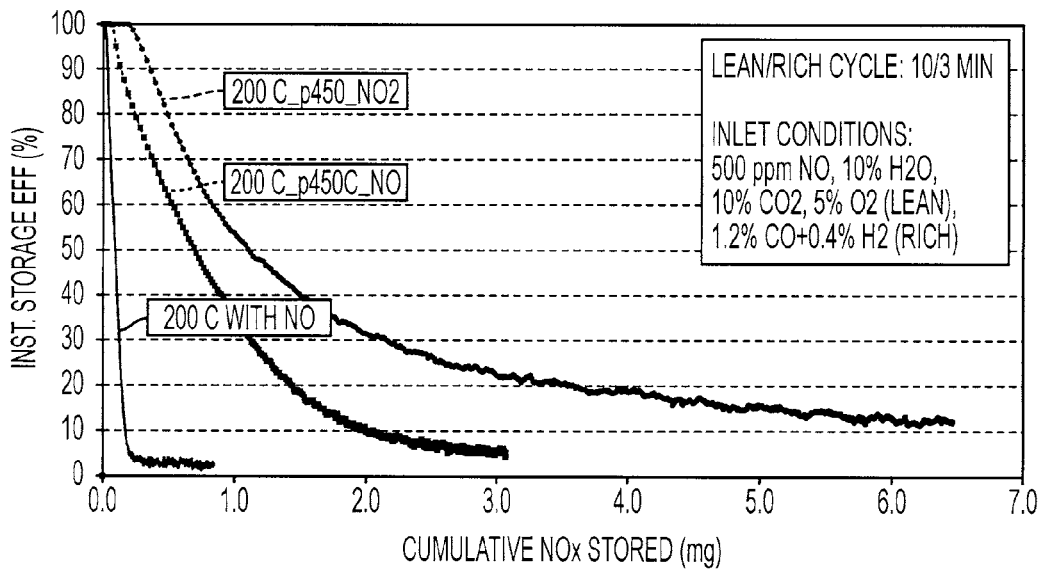
FIG. 6 shows storage efficiency vs $NO_x$ storage amount at 200° C. (1) with 500 ppm NO in the feedgas after purging at the storage temperature, (2) with 500 ppm NO in the feedgas after purging at 450° C., (3) with 500 ppm $NO_2$ in the feedgas after purging at 450° C., corresponding to FIG. 5.

As shown by the figure, a more thorough purge of the LNT enables improved storage capacity and $NO_x$ storage efficiency even at low temperatures. Further, as shown by the dashed line with solid circles, these may be even higher when $NO_2$ is supplied relative to when NO is supplied. Relative to when the feedgas contained 500 ppm NO, increased capacity may be achieved when the feedgas contained 500 ppm $NO_2$. FIG. 6 further illustrates the $NO_x$ storage efficiency at 200° C. as a function of the amount of $NO_x$ stored with NO in the feedgas after purging at 200° C., with NO in the feedgas after purging at 450° C., and with $NO_2$ in the feedgas after purging at 450° C. For a given amount of $NO_x$ stored, the storage efficiency was higher when $NO_2$ was used relative to when NO was used. The use of $NO_2$ may improve both the total storage capacity as well as the $NO_x$ storage efficiency. Thus, it may be beneficial for the low temperature storage performance to pre-oxidize some of the NO in the exhaust to $NO_2$ over a light-off catalyst upstream of the LNT.

Figure 7:
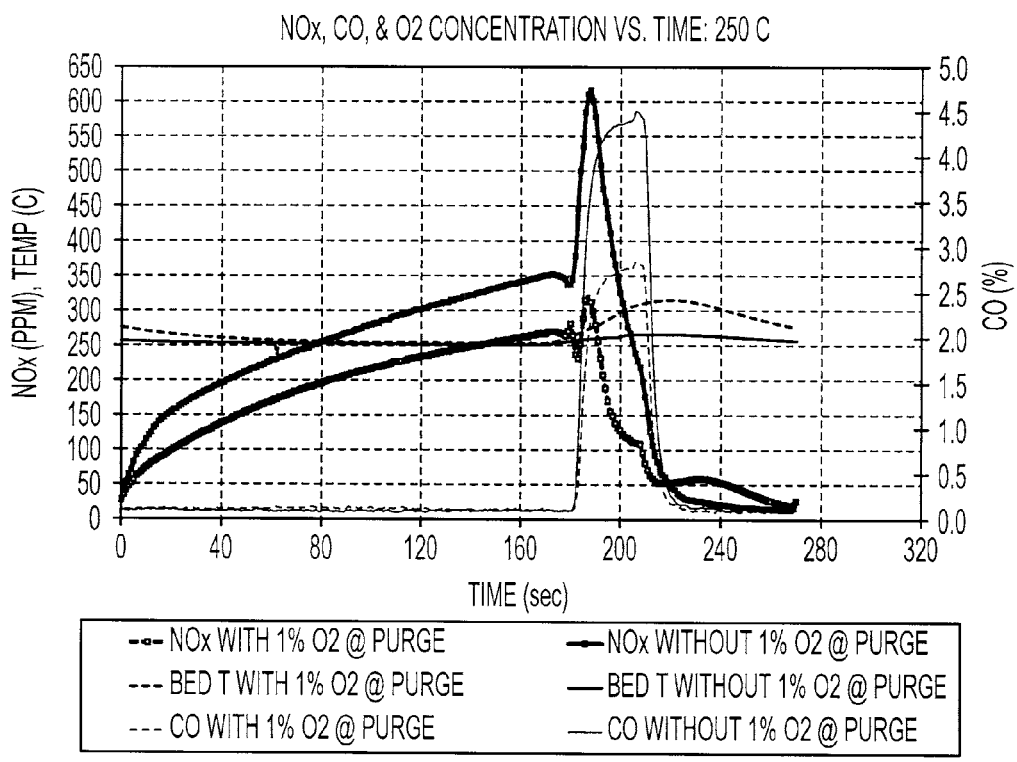
FIG. 7 shows tailpipe $NO_x$, tailpipe CO, and bed temperature during 3 minute storage period at 250° C. for fresh $Ba/Pt/Al_2O_3$ LNT, where the sample was purged for 30 seconds with 5% CO+1.7% $H_2$ with or without 1% $O_2$. Following 30 second purge, NO turned off for 60 seconds before next cycle.

As noted herein, various approaches may be used to generate an exotherm on or upstream of the LNT to improve the purging of the trap at low temperatures. One approach includes providing some oxygen along with reductants ($H_2$ and CO). In one example, the amount of $O_2$ to be supplied is less than that required to totally oxidize the reductants, so that the overall A/F ratio remains rich during the purge. However, the exotherm from the oxygen reacting with some of reductant may quickly heat up the LNT surface. Since the thoroughness of purging increases with temperature as shown above, the LNT is better able to store $NO_x$ during the next lean period. To further demonstrate this, a fresh barium/platinum/alumina LNT was evaluated for $NO_x$ storage capacity at approximately 250° C. after purging with 5% CO+1.7% $H_2$. On one test, the exhaust included 1% $O_2$ during the purge, while on another test there was no $O_2$ during the purge. FIG. 7 compares the tailpipe $NO_x$, tailpipe CO, and measured bed temperature with and without the 1% $O_2$ during the purge. The gas temperature measured with a thermocouple increased by about 65° C. during the purge with 1% $O_2$, while the gas temperature only increased by about 15° C. during the purge without the 1% $O_2$. The maximum CO did not rise as high with the 1% $O_2$ during the purge since some of the CO was oxidized by the $O_2$.

Figure 8:
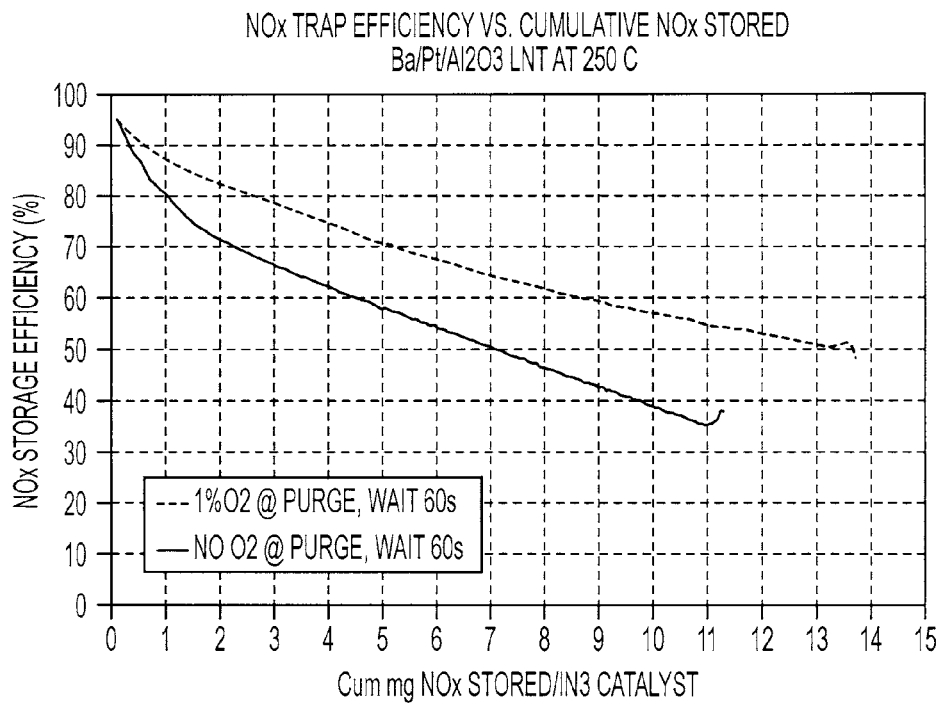
FIG. 8 shows $NO_x$ storage efficiency vs $NO_x$ storage amount at 250° C. during a 180 s storage period for a fresh $Ba/Pt/Al_2O_3$ LNT, where the sample is purged for 30 seconds with 5% CO+1.7% H2 with or without 1% $O_2$. After 30 second purge, NO turned off for 60 seconds before next cycle.

In order to isolate the effect of the 1% $O_2$ on the thoroughness of the purge, the catalyst temperatures were adjusted to be relatively close during the storage periods. Therefore, the 30 second purges in FIG. 6 were followed by a 60 second period without NO before the NO was turned on, to allow the exothermic heat generated in the LNT during the purge to dissipate into the exhaust gas. FIG. 8 shows the $NO_x$ storage efficiency as a function of the amount of $NO_x$ stored during the lean storage periods for these two cases. The 1% $O_2$ during the purge improves the storage efficiency (Y-axis) and storage capacity (X-axis). Since 60 seconds were allowed for the exothermic heat to dissipate, the improved storage performance indicates that the 1% $O_2$ improved the thoroughness of the purge. The average $NO_x$ storage efficiency during the first 60 seconds of lean operation was about 70% after the purge without 1% $O_2$ and about 79% after the purge with 1% $O_2$, or a 9% improvement in storage efficiency.

Besides improving the storage efficiency during the lean periods, FIG. 7 indicates that the use of 1% $O_2$ during the purge also decreased the amount of $NO_x$ released from the trap during the purge. This may again be attributed to the higher temperatures generated during the purge, which increases the conversion activity of the precious metals. While this test utilized 1% $O_2$ during the purge, this is just an example, and as noted above variable amount of excess oxygen may be used based on operating conditions, such as temperature, engine speed, load, etc.

Figure 9:
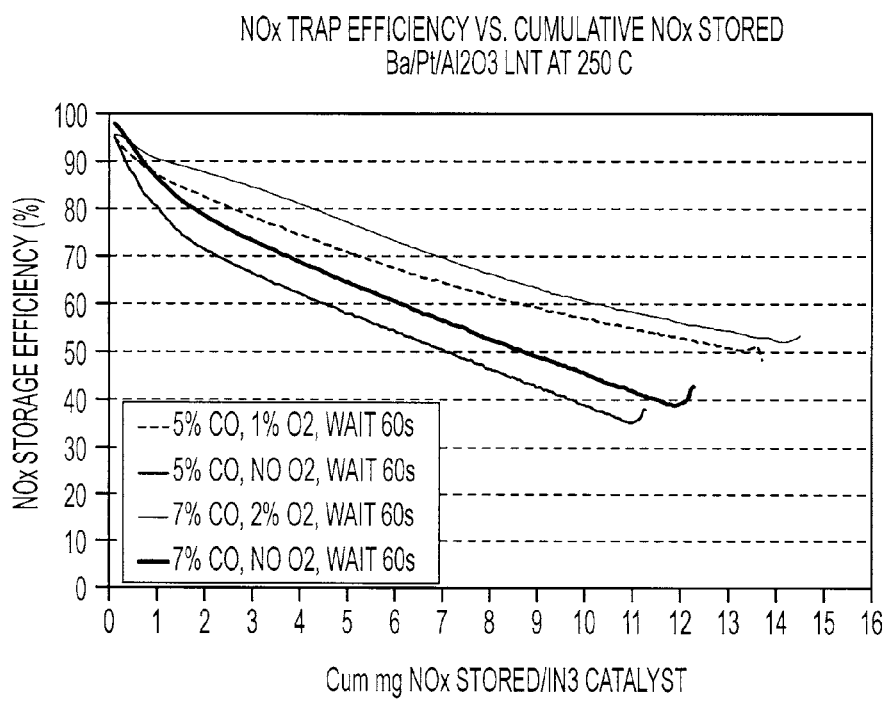
FIG. 9 shows $NO_x$ storage efficiency vs $NO_x$ storage amount at 250° C. during a 180 second storage period for a fresh $Ba/Pt/Al_2O_3$ LNT, where the sample is purged for 30 seconds with 5% CO+1.7% $H_2$ with or without 1% $O_2$, or with 7% CO+2.3% $H_2$ with or without 2% $O_2$. After 30 second purge, NO was turned off for 60 seconds before next cycle.

Additional tests were performed with 7% CO+$H_2$ with and without 2% $O_2$ during the purges, to increase the exotherm during the purge. Again, a 60 second wait period without NO followed the purge before NO was injected for 180 seconds, to allow time for the LNT to cool off after the exothermic purge. Here the maximum gas exotherms with and without the 2% $O_2$ were 93° C. and 15° C., respectively. FIG. 9 compares the $NO_x$ storage efficiency vs $NO_x$ storage amount curves for these tests to the tests from FIG. 7. The efficiency vs capacity curves were improved in both cases. As such, it may be advantageous to vary the amount of exotherm generated by varying the level and/or duration of excess oxygen provided during at least a portion of the purge.

Figure 10:
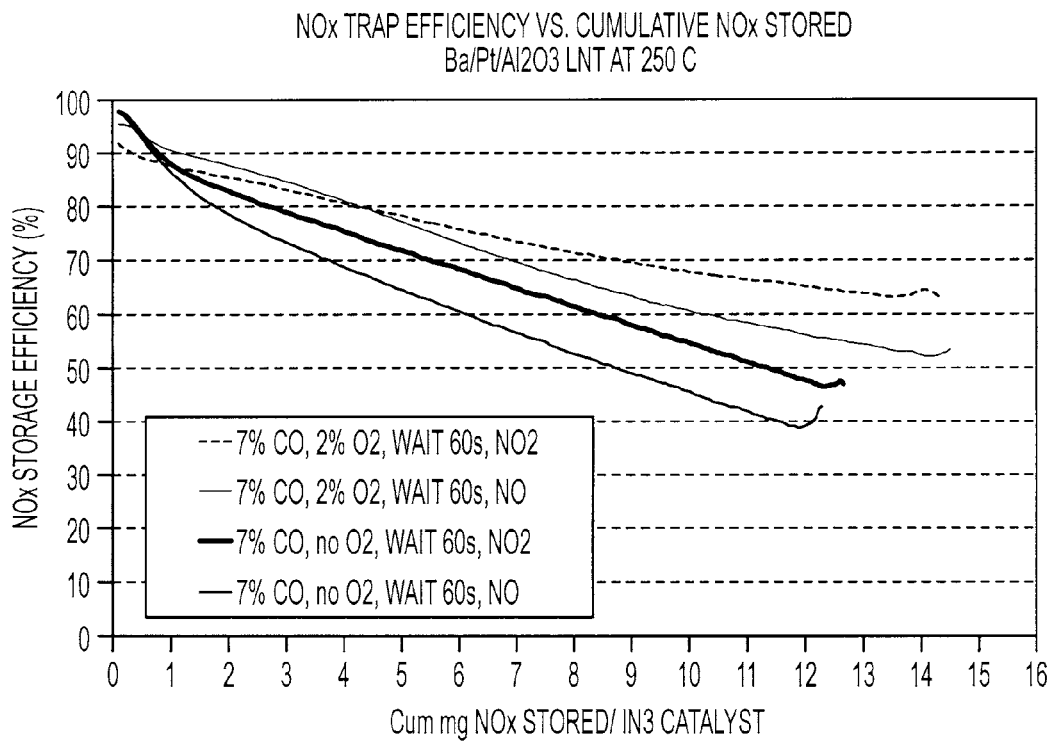
FIG. 10 shows $NO_x$ storage efficiency vs $NO_x$ storage amount at 250° C. during a 180 second storage period for a fresh $Ba/Pt/Al_2O_3$ LNT, where the sample is purged for 30 seconds with 7% CO+2.3% $H_2$ with or without 2% $O_2$. After 30 second purge, NOx was turned off for 60 seconds, then either 500 ppm NO or 500 ppm $NO_2$ injected for 180 seconds.

Finally, the tests with 7% CO+$H_2$ with and without 2% $O_2$ were repeated with the 500 ppm NO replaced with 500 ppm $NO_2$. FIG. 10 compares the efficiency vs capacity curves for the tests with $NO_2$ to the corresponding tests with $NO_x$. The use of $NO_2$ improved the $NO_x$ storage performance in both cases. The best $NO_x$ storage performance was obtained after the exothermic purge and with the use of $NO_2$ during the storage period.

Thus, to further enhance the low temperature performance of the LNT, a catalyst upstream of the LNT may be used to pre-oxidize some of the NO in the exhaust to $NO_2$, since the efficiency of storing $NO_2$ may be higher than the efficiency of storing NO. FIG. 5 shows that, after a thorough purge at 450° C. followed by cooling of the trap to a lower temperature, the storage efficiency between 200° C. and 350° C. is higher with $NO_2$ than with NO. As noted above, this may be because the first step in the $NO_x$ storage process is the oxidation of NO to $NO_2$. The $NO_2$ then reacts with the $NO_x$ storage materials (e.g., barium) and additional oxygen to form the adsorbed $NO_x$ species, such as nitrates. At lower temperatures, the NO oxidation capability of the LNT may be more limited, particularly after thermal aging, so the $NO_x$ storage efficiency likewise may be limited. Thus, by oxidizing NO to $NO_2$ on an upstream catalyst, which is operating at a higher temperature than the LNT and is therefore more capable of oxidizing NO to $NO_2$, then the $NO_x$ storage efficiency on the trap can be improved.

Figure 11:
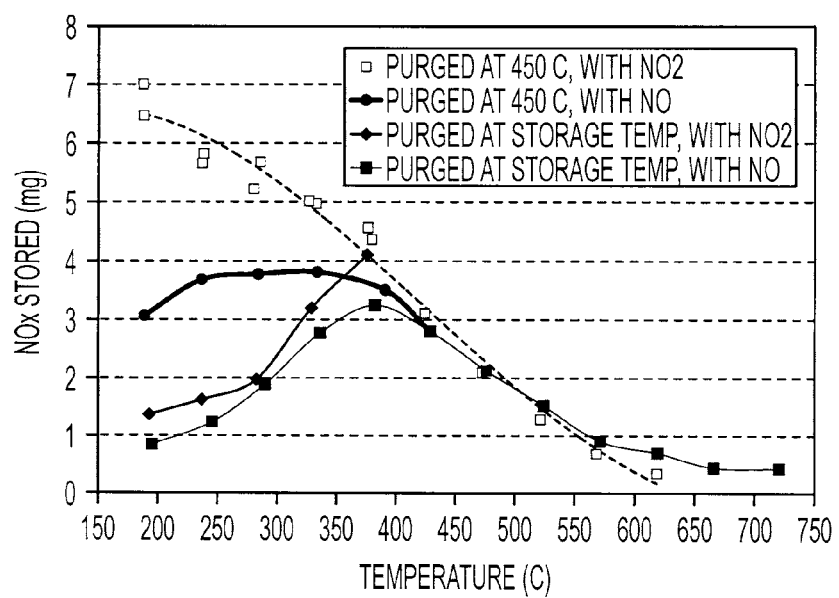
FIG. 11 shows experimental data similar to that of FIG. 5, but further illustrating the amount of $NO_x$ stored on a fresh 0.25" potassium/platinum/alumina LNT vs. temperature with 500 ppm $NO_2$ in the feedgas after purging at the storage temperature.

However, at lower temperatures, pre-oxidation of the NO to $NO_2$ improves overall performance only if the trap has been sufficiently purged. FIG. 11 shows that, after purging at low temperatures, the amount of $NO_x$ stored with $NO_2$ in the feedgas was only slightly higher than the amount of $NO_x$ stored with NO in the feedgas, due to incomplete purging at these low temperatures. Thus, the inventors herein have recognized a synergistic effect that occurs when the LNT temperature is low, where the improved purging that results from the generation of an exotherm on the trap during the purge allows the trap to make better use of the $NO_2$ that results from the pre-oxidation of NO to $NO_2$ on an upstream catalyst Thus, in one example using a close-coupled three-way catalyst mounted close to the exhaust manifold, such as noted in the configuration of FIG. 1, may be used to improve low temperature performance by enabling some pre-oxidation. For example, an upstream, close-coupled TWC may provide HC and CO oxidation capability during lean operation. The function of oxidizing NO to $NO_2$ could be enhanced in close-coupled TWCs by including at least some platinum. The TWC could also contain palladium and rhodium to enhance its HC activity and its $NO_x$ conversion at stoichiometry. The NO oxidation tends to increase with platinum concentration, so the Pt loading may be selected to be at least 10 grams per cubic foot (gpcf). The TWC could also contain base metals such as manganese, as these materials may aid NO oxidation.

Figure 12:
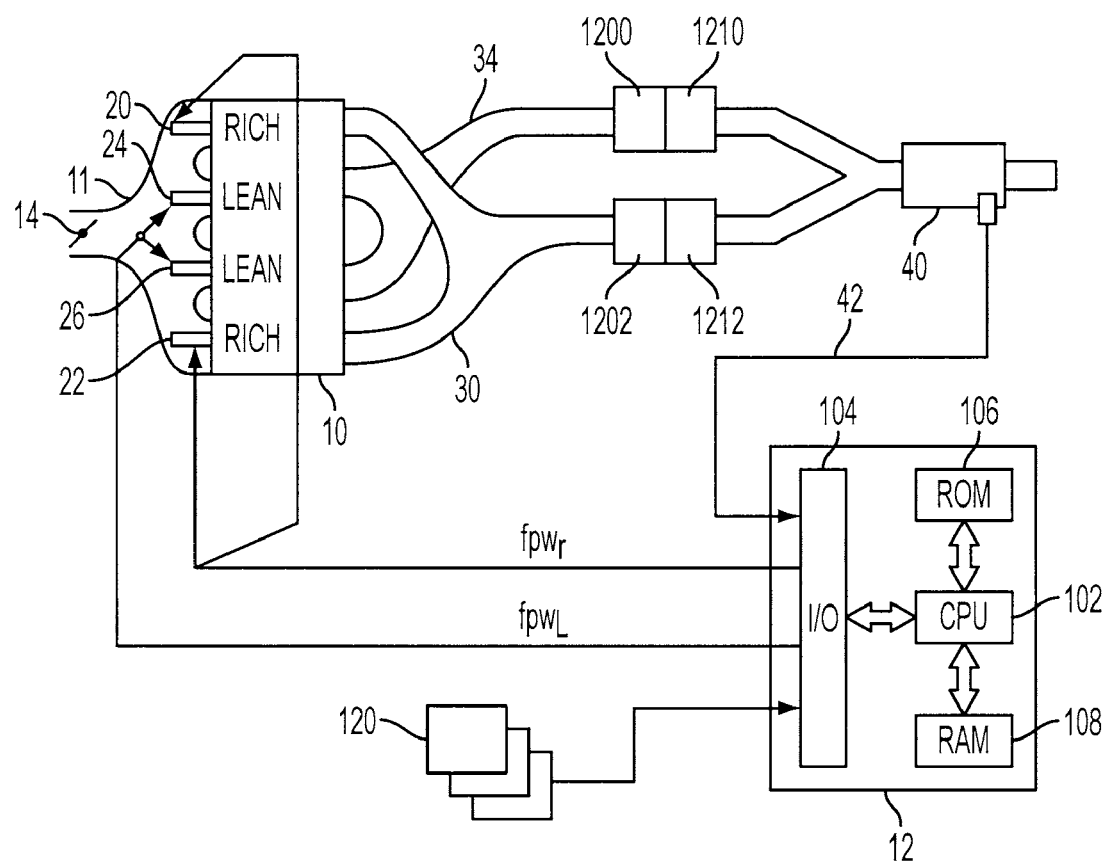
FIG. 12 shows an example configuration similar to that of FIG. 1, with an alternative upstream, close coupled, catalyst configuration.

FIG. 12 shows an alternative embodiment engine system that may be used to take advantage of the synergy obtained using NO2 with the exothermic reaction during lower temperature NOx purges. Specifically, as shown, a separate brick 1210, 1212 between the TWCs 1200, 1202 and LNT 40 could be used to oxidize NO to $NO_2$. This would allow the TWC to be optimized for lightoff and stoichiometric performance while optimizing the NO oxidation catalyst to maximize its NO oxidation activity. Again, this NO oxidation catalysts 1210, 1212 may contain 10 gpcf or more of platinum and optionally some base metals active for NO oxidation. Further, positioning the oxidations catalyst 1210, 1212 close to the TWCs may enable advantageous use of the higher temperature environment, as this may improve the NO oxidation performance. To generate the exotherm on the LNT during the purge while reducing the generation on the NO oxidation catalysts, a separate NO oxidation catalyst may be used on each bank or each leg of the exhaust system, as shown in FIG. 12.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of controlling an engine having a lean NOx trap in an exhaust, the method comprising:
   during a first mode, at a first temperature, storing NOx at a lean condition and then purging stored NOx from the NOx trap at a rich condition without concurrently supplying oxygen to the trap during the purging; and
   during a second mode, at a second, lower temperature, storing NOx at a lean condition and then purging stored NOx from the NOx trap, where an exothermic reaction is generated at the NOx trap to temporarily raise the temperature of the trap by supplying oxygen and reductants with an overall rich mixture to the trap during the purging.

2. The method of claim 1 where the second temperature is between 200 and 300° C.

3. The method of claim 2 where the exothermic reaction is generated by operating a first group of cylinders lean and a second group of cylinders rich.

4. The method of claim 3 wherein the exothermic reaction is adjusted by adjusting a duration of the lean cylinder group operation.

5. The method of claim 3 wherein the exothermic reaction is adjusted by adjusting a lean air-fuel ratio of the lean cylinder group operation.

6. The method of claim 3 where the first and second cylinder groups operate rich during the purging in the first mode.

7. The method of claim 3 where one of the first and second cylinder groups operates stoichiometric during at least a portion of the purging in the first mode.

8. A method for controlling operation of an engine, the engine having an emission control device coupled in an engine exhaust, the method comprising:
   during a first mode when a temperature of the emission control device is greater than a threshold, purging NOx stored by at least one of:
      operating first and second cylinder groups rich for at least a portion of the purge; and
      operating the first cylinder group stoichiometric and the second cylinder group rich for at least a portion of the purge; and
   during a second mode when the temperature of the emission control device is less than the threshold, operating at least one of the cylinder groups lean and operating another cylinder group rich, where a mixture of at least one of the cylinder groups is rich of stoichiometry, for at least a portion of the purge.

9. The method of claim 8 where the lean cylinder group operates with less than 3% excess oxygen, and where the temperature threshold varies based on degradation of an NOx trap.

10. The method of claim 9 where the temperature is a temperature of the NOx trap.

11. The method of claim 10 where the temperature is a cycle average temperature over both NOx storage and purging operation.

12. The method of claim 11 where, during the second mode, the lean operation is adjusted to vary a duration and level of excess oxygen provided based on the temperature.

13. The method of claim 12 where, after the duration, the lean operation is ended.

14. A system for an engine, comprising:
   a first bank of cylinders of the engine;
   a second bank of cylinders of the engine;
   a first catalyst coupled to the first bank;
   a second catalyst coupled to second bank;
   a NOx trap coupled downstream of the first and second catalyst; and
   a controller to:
      during a first mode at a first temperature of the NOx trap:
         transition from operating the first and second banks lean of stoichiometry to operating both the first and second banks rich to purge stored NOx; and
      during a second mode at a second temperature of the NOx trap below the first temperature:
         transition from operating both the first and second banks lean to operating the first bank rich of stoichiometry and the second bank slightly lean of stoichiometry for a first duration with an overall rich air-fuel ratio to purge stored NOx, and then operating the second bank stoichiometric or rich for a second duration following the first duration to purge stored NOx, where a length of the first duration is adjusted with temperature of the NOx trap.

15. The system of claim 14 where the first and second catalysts are close coupled three way catalysts.

16. The system of claim 14 wherein the first and second catalysts include oxidation catalysts to pre-oxidize NO to $NO_2$ during lean operation.

17. The system of claim 14 wherein the first temperature is above 300° C.

18. The system of claim 14 wherein the second temperature is below 300° C.

19. The system of claim 14 wherein the overall rich air-fuel ratio is between 7 and 30% rich.

* * * * *